United States Patent
Shiba (10) Patent No.: US 7,087,889 B2
(45) Date of Patent: Aug. 8, 2006

(54) ROTATIONAL ANGLE DETECTING APPARATUS AND TORQUE DETECTING APPARATUS

(75) Inventor: Mahito Shiba, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 252 days.

(21) Appl. No.: 10/444,900

(22) Filed: May 23, 2003

(65) Prior Publication Data

US 2003/0218126 A1 Nov. 27, 2003

(30) Foreign Application Priority Data

May 23, 2002 (JP) .............................. 2002-149819

(51) Int. Cl.
G01J 5/34 (2006.01)
G01L 3/02 (2006.01)
(52) U.S. Cl. ........................... 250/231.13; 250/231.15; 73/862.324
(58) Field of Classification Search ........... 250/231.14, 250/231.15; 356/614; 73/862.324, 862.334
See application file for complete search history.

(56) References Cited

U.S. PATENT DOCUMENTS

2003/0145663 A1* 8/2003 Heisenberg et al. ... 73/862.324

FOREIGN PATENT DOCUMENTS

| DE | 100 36 281 A1 | 2/2002 |
|---|---|---|
| EP | 1 344 711 A2 | 9/2003 |
| EP | 1 357 015 A2 | 10/2003 |
| FR | 2 689 633 A1 | 10/1993 |
| JP | 63-075630 | 4/1988 |
| JP | 2002-069121 | 3/2002 |
| WO | WO-01/42753 A1 | 6/2001 |

* cited by examiner

Primary Examiner—Stephone B. Allen
(74) Attorney, Agent, or Firm—Darby & Darby (57) ABSTRACT

First and second targets, the numbers of which are coprime, are provided at a rotor. Two detecting means oppose each of the first and second targets to output detection signals having phases different from each other in accordance with each position of the targets as the rotor rotates. The rotational angle detecting apparatus has calculating means for executing a predetermined calculation based on each detection signal of the two detecting means and storage means for storing a relation between a result of calculation executed in advance by the calculating means and an electrical angle of a detection signal, obtains an electrical angle of each detection signal by referring to the storage means using a calculation result of the calculating means and detects a rotational angle of the rotor based on the obtained electrical angle. Consequently, no discontinuous portion forms in a detected steering angle signal and the differential signal thereof.

5 Claims, 8 Drawing Sheets

ROTATIONAL ANGLE DETECTING APPARATUS AND TORQUE DETECTING APPARATUS

CROSS REFERENCE TO RELATED APPLICATIONS

This application claims priority under 35 U.S.C. § 119 of Japanese Patent Application No. 2002-149819, filed May 23, 2002.

BACKGROUND OF THE INVENTION

1. Field of the Invention

The present invention relates to a rotational angle detecting apparatus and a torque detecting apparatus comprising one or a plurality of targets provided at a rotor and a plurality of detecting means, disposed opposite to the targets, for outputting detection signals having phases different from each other in accordance with each position of the targets as the rotor rotates.

2. Description of Related Art

Known as one of steering apparatuses for an automobile is an electric power steering apparatus capable of reducing driver's load by driving an electric motor to assist steering. Such an electric power steering apparatus comprises an input shaft joined to a steering wheel, an output shaft connected to steerable wheels by a pinion and a rack or the like and a connection shaft for connecting the input shaft with the output shaft so as to detect, by a torque sensor, a steering torque applied to the input shaft on the basis of a torsional angle generated at the connection shaft and to drive an electric motor for steering assist, which interlocks with the output shaft, in a controlled manner on the basis of the steering torque detected by the torque sensor.

The present applicant has suggested in Japanese Patent Application No. 2002-69121 a rotational angle detecting apparatus comprising one or a plurality of first targets provided at a rotor; first detecting means, disposed opposite to the first targets, for outputting a detection signal as the rotor rotates; second detecting means for outputting a detection signal having a phase different from that of the detection signal outputted from the first detecting means; second targets, provided at a rotor, the number of which is coprime with the number of the first targets; third detecting means, disposed opposite to the second targets, for outputting a detection signal as the rotor rotates; and fourth detecting means for outputting a detection signal having a phase different from that of the detection signal outputted from the third detecting means, wherein a rotational angle of the rotor is detected on the basis of the detection signals respectively outputted from the first detecting means, second detecting means, third detecting means and fourth detecting means. The application also suggests a torque detecting apparatus (torque sensor) comprising this rotational angle detecting apparatus and a steering apparatus comprising this torque detecting apparatus.

According to the conventional rotational angle detecting apparatus and torque detecting apparatus, since a detection signal outputted from one detecting means includes curved portions in the vicinity of the relative maximum value and the relative minimum value, two detecting means for outputting detection signals having phases different from each other are provided so as to obtain a linear detection signal by switching between the two detection signals in order to detect the angle and the torque. Such a structure, however, may do harm to steering feeling since discontinuous portions form in the detected angle signal and torque signal and in the differential signals thereof.

BRIEF SUMMARY OF THE INVENTION

The present invention has been made with the aim of solving the above problem, and it is an object thereof to provide a rotational angle detecting apparatus with which no continuous portion forms in a detected steering angle signal and the differential signal thereof.

Another object of the present invention is to provide a torque detecting apparatus with which no continuous portion forms in a detected torque signal and the differential signal thereof.

A rotational angle detecting apparatus according to the present invention comprises one or a plurality of first targets provided at a rotor; second targets, provided at this rotor or another rotor rotating coaxially with this rotor, the number of which is coprime with the number of the first targets; a plurality of detecting means, disposed opposite to the first targets, for outputting detection signals having phases different from each other in accordance with each position of the first targets as the rotor provided with the first targets rotates; and a plurality of detecting means, disposed opposite to the second targets, for outputting detection signals having phases different from each other in accordance with each position of the second targets as the rotor provided with the second targets rotates, so as to detect a rotational angle of the rotor on the basis of the detection signals respectively outputted from the detecting means. The rotational angle detecting apparatus further comprises calculating means for executing a predetermined calculation on the basis of the detection signals respectively outputted from the plurality of detecting means; storage means for storing the relation between a result of calculation executed in advance by the calculating means and an electrical angle of a detection signal; and means for obtaining an electrical angle of each of the detection signals on the basis of a result of calculation executed by the calculating means by referring to the storage means, so that a rotational angle of the rotor is detected on the basis of the electrical angle obtained by said means.

According to this rotational angle detecting apparatus, the plurality of detecting means respectively outputs detection signals having phases different from each other in accordance with each position of the first targets and the second targets as the rotor rotates, so that the rotational angle of the rotor is detected on the basis of the detection signals respectively outputted from the detecting means. The calculating means executes a predetermined calculation on the basis of the detection signals respectively outputted from the plurality of detecting means. The storage means stores the relation between a result of calculation executed in advance by the calculating means and an electrical angle of a detection signal. Referring to the storage means, the obtaining means obtains electrical angles of the detection signals on the basis of a result of calculation executed by the calculating means and the rotational angle of the rotor is detected on the basis of the electrical angle obtained by the obtaining means.

Such a structure can realize a rotational angle detecting apparatus with which time required for calculation for detection can be decreased, distortion of each target and sensor can be corrected and no discontinuous portion forms in the detected steering angle signal and the differential signal thereof.

In the rotational angle detecting apparatus according to the present invention, the rotor may be a gear having teeth made of magnetic material, which are arranged on the peripheral surface of the rotor at regular intervals, as the first targets or second targets, and the detecting means may be magnetic sensors.

According to this rotational angle detecting apparatus, the detecting means detects the strength of magnetic field in accordance with each rotational position of the gear. Such a structure can realize a rotational angle detecting apparatus with which time required for calculation for detection can be decreased, distortion of each target and sensor can be corrected and no discontinuous portion forms in the detected steering angle signal and the differential signal thereof.

In a torque detecting apparatus according to the present invention, rotors are coaxially provided respectively at a first shaft and a second shaft connected with each other by a connection shaft. Each rotor is provided with one or a plurality of targets. A plurality of detecting means respectively disposed opposite to each rotor outputs detection signals having phases different from each other in accordance with each position of the target as the rotor rotates, and a torque applied to the first shaft or the second shaft is detected on the basis of the detection signals respectively outputted from the detecting means. The torque detecting apparatus further comprises calculating means for executing a predetermined calculation on the basis of the detection signals respectively outputted from the plurality of detecting means; storage means for storing the relation between a result of calculation executed in advance by the calculating means and an electrical angle of a detection signal; and means for obtaining an electrical angle of each of the detection signals on the basis of a result of calculation executed by the calculating means by referring to the storage means, so as to detect the torque on the basis of the electrical angle obtained by this means.

According to this torque detecting apparatus, a plurality of detecting means outputs detection signals having phases different from each other in accordance with each position of the targets as the rotor rotates, and a torque applied to the first shaft or the second shaft is detected on the basis of the detection signals respectively outputted from the detecting means. The calculating means executes a predetermined calculation on the basis of the detection signals respectively outputted from the plurality of detecting means. The storage means stores the relation between a result of calculation executed in advance by the calculating means and an electrical angle of a detection signal. Referring to the storage means, the obtaining means obtains an electrical angle of each of the detection signals on the basis of a result of calculation executed by the calculating means and a torque is detected on the basis of the electrical angle obtained by the obtaining means.

Such a structure can realize a torque detecting apparatus with which time required for calculation for detection can be decreased, distortion of each target and sensor can be corrected and no discontinuous portion forms in the detected torque signal and the differential signal thereof.

In the torque detecting apparatus according to the present invention, the rotor may be a gear having teeth made of magnetic material, which are arranged on the peripheral surface of the rotor at regular intervals, as the targets, and the detecting means may be magnetic sensors.

According to this torque detecting apparatus, the detecting means detects the strength of magnetic field in accordance with each rotational position of the gear. Such a structure can realize a torque detecting apparatus with which time required for calculation for detection can be decreased, distortion of each target and sensor can be corrected and no discontinuous portion forms in the detected torque signal and the differential signal thereof.

A torque detecting apparatus according to the present invention comprises a rotational angle detecting apparatus according to this invention provided at one of a first shaft and a second shaft which are connected with each other by a connection shaft and first targets and a plurality of detecting means provided at the other of the first shaft and the second shaft. Calculating means executes a predetermined calculation respectively on the basis of detection signals respectively outputted from the plurality of detecting means of the first targets provided at the first shaft and the second shaft. Referring to storage means, each electrical angle of each detection signal is obtained on the basis of a result of executed calculation. A torque applied to the first shaft or the second shaft is detected on the basis of each of the obtained electrical angles.

Such a structure can realize a torque detecting apparatus with which time required for calculation for detection can be decreased, distortion of each target and sensor can be corrected and no discontinuous portion forms in the detected torque signal and the differential signal thereof.

The above and further objects and features of the invention will more fully be apparent from the following detailed description with accompanying drawings.

DETAILED DESCRIPTION OF THE INVENTION

The following description will explain the present invention with reference to the drawings illustrating embodiments thereof.

Figure 1:
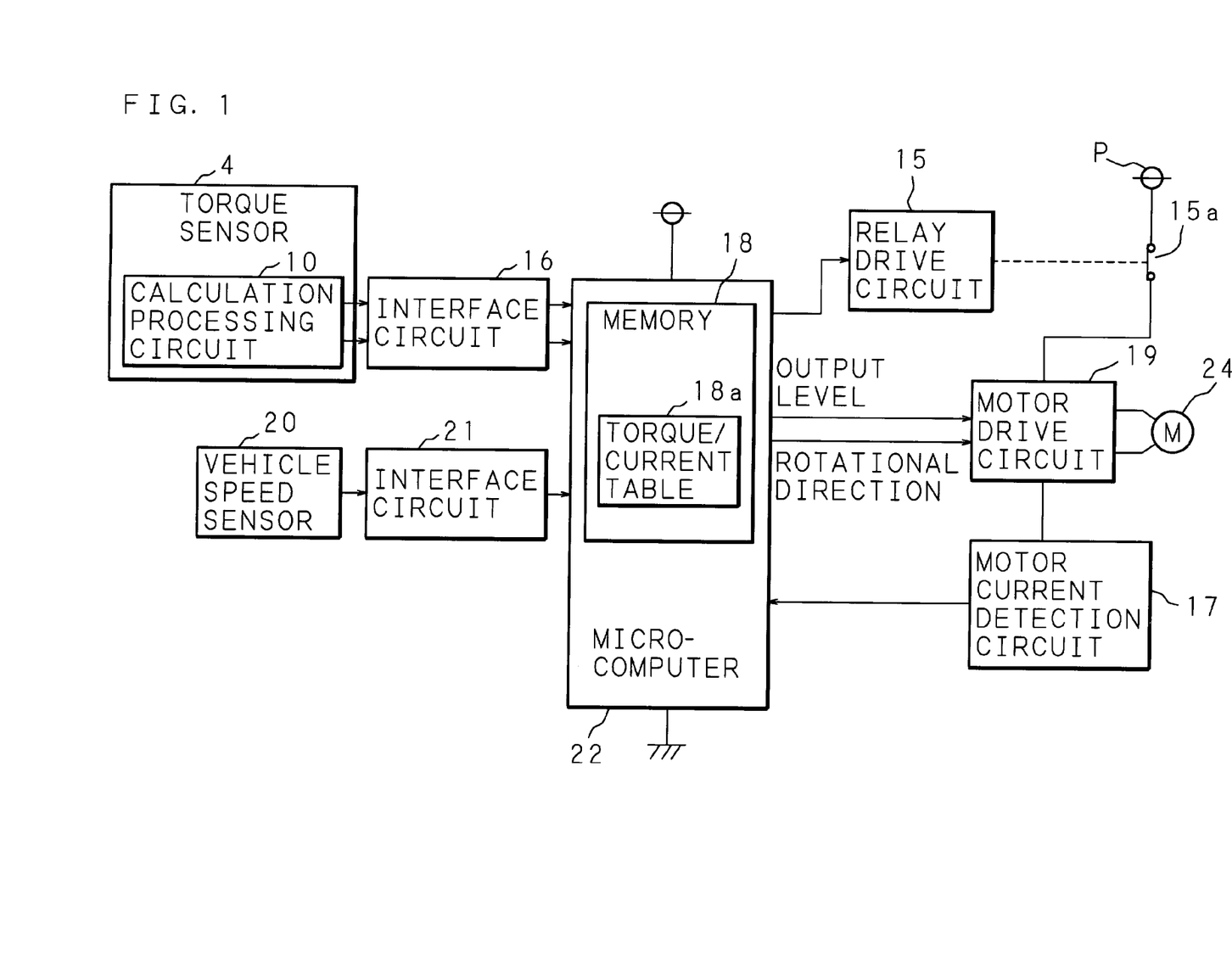
FIG. 1 is a block diagram showing the structure of a main part of an electric power steering apparatus comprising an embodiment of a rotational angle detecting apparatus and a torque detecting apparatus according to the present invention.

FIG. 1 is a block diagram showing the structure of a main part of an electric power steering apparatus comprising an embodiment of a rotational angle detecting apparatus and a torque detecting apparatus according to the present invention. In the electric power steering apparatus, a torque value and an absolute steering angle detected by a torque sensor 4 (torque detecting apparatus) for detecting a torque applied to a steering shaft (not illustrated in the figure) is supplied from a calculation processing circuit 10 of the torque sensor 4 via an interface circuit 16 to a microcomputer 22.

A detection signal outputted from a vehicle speed sensor 20 for detecting a vehicle speed is supplied to the microcomputer 22 via another interface circuit 21.

A relay control signal outputted from the microcomputer 22 is inputted to a relay drive circuit 15, so that the relay drive circuit 15 turns on or off a fail-safe relay 15a in response to the relay control signal.

Referring to a torque/current table 18a in a memory 18, the micro computer 22 generates a motor control signal on the basis of a torque value, a vehicle speed and an absolute steering angle, and a motor current which will be described later. The generated motor control signal (output level and rotational direction) is supplied to a motor drive circuit 19. On the basis of the supplied motor control signal, the motor drive circuit 19 drives a steering assist motor 24 to rotate.

A motor current of the steering assist motor 24 flowing in the motor drive circuit 19 is detected by a motor current detection circuit 17 and the detection result is supplied to the microcomputer 22.

Figure 2:
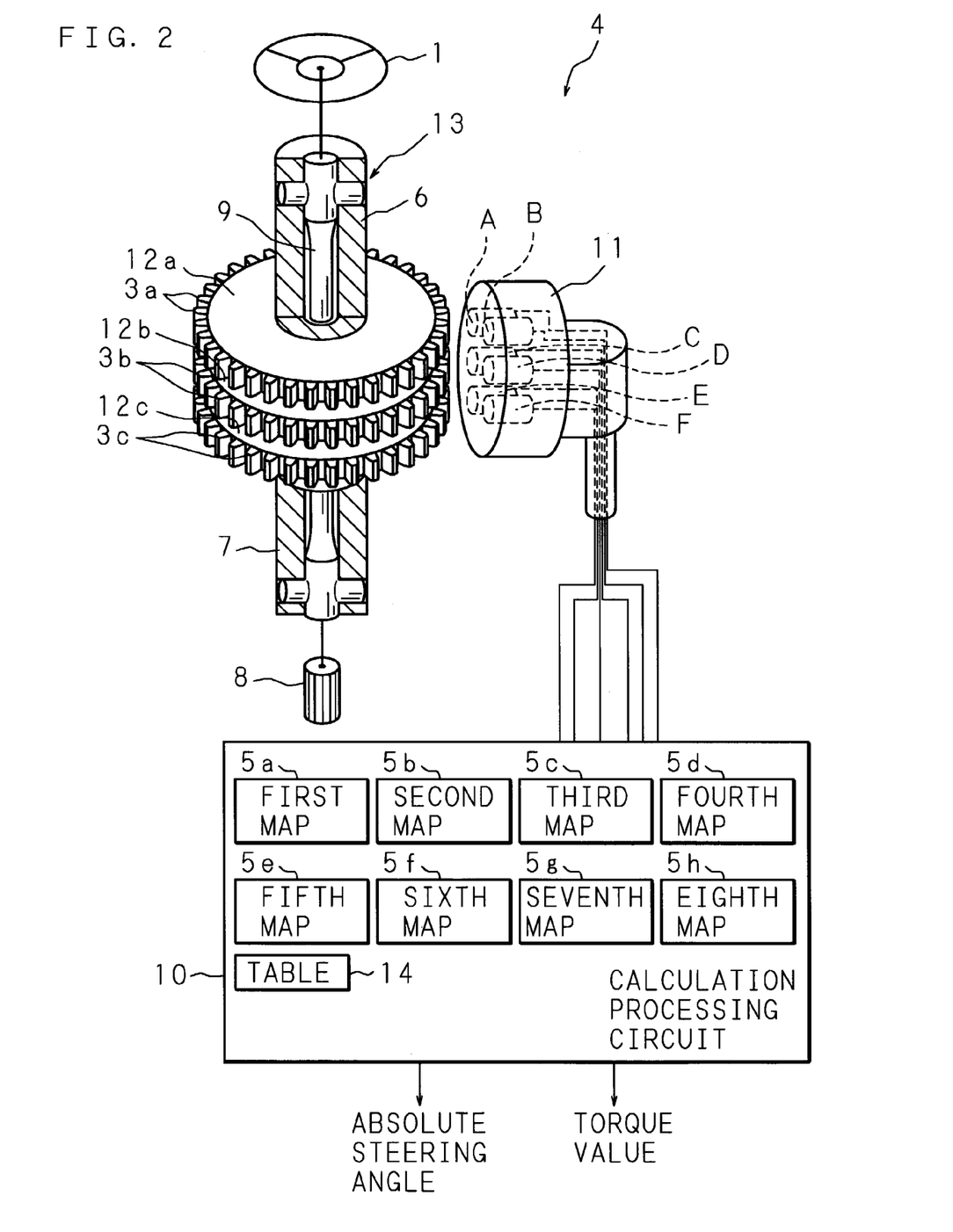
FIG. 2 is a schematic view schematically showing an example of the structure of a torque sensor.

FIG. 2 is a schematic view schematically showing an example of the structure of the torque sensor 4. In the torque sensor 4, an input shaft 6 (rotor, first shaft) having an upper end joined to a steering wheel 1 (steering member) and an output shaft 7 (rotor, second shaft) having a lower end joined to a pinion 8 of a steering mechanism are coaxially connected with each other via a torsion bar 9 (connection shaft) of a small diameter, so as to compose a steering shaft 13 which couples the steering wheel 1 and the steering mechanism. The portions of the input shaft 6 and the output shaft 7 where the two shafts are joined to each other are constructed as described hereinafter.

A disk-shaped target plate 12a is coaxially fitted on a portion of the input shaft 6 in the vicinity of the end which is joined with the output shaft 7. On the peripheral surface of the target plate 12a, thirty seven, for example, targets 3a configured as protrusions made of magnetic material are projected at regular intervals in a circumferential direction. Each target 3a is configured as a tooth of a spur gear. The annular spur gear composes the target plate 12a and the targets 3a.

Disk-shaped target plates 12b and 12c (rotors) are coaxially fitted on portions of the output shaft 7 in the vicinity of the end which is joined with the input shaft 6, with the target plate 12b positioned closer to the input shaft 6. On the peripheral surface of the target plate 12c, the same number of targets 3c as the targets 3a, i.e. thirty seven targets 3c, configured as protrusions made of magnetic material are projected at regular intervals as aligned with the targets 3a in a circumferential direction. On the peripheral surface of the target plate 12b, targets 3b the number of which is coprime with the number of the targets 3c, thirty six targets 3b for example, configured as protrusions made of magnetic material are projected at regular intervals in a circumferential direction. Here, to be coprime means that the two numbers have no common divisor except 1.

Each of the targets 3b and 3c is configured as a tooth of a spur gear. The annular spur gears compose the target plates 12b and 12c and the targets 3b and 3c.

A sensor box 11 is disposed outside the target plates 12a, 12b and 12c to face the outer edges of the targets 3a, 3b and 3c which are provided respectively at the periphery of the target plates. The sensor box 11 is fixedly supported at an immovable part of a housing (not illustrated in the figure) for supporting the input shaft 6 and the output shaft 7, or the like. The sensor box 11 houses magnetic sensors A and B (detecting means) opposing positions different from each other in the circumferential direction of the targets 3a on the input shaft 6 and magnetic sensors E and F (detecting means) opposing positions different from each other in the circumferential direction of the targets 3c on the output shaft 7 with the positions thereof in the circumferential direction aligned appropriately. The sensor box 11 also houses magnetic sensors C and D (detecting means) opposing positions different from each other in the circumferential direction of the targets 3b on the output shaft 7.

Each of the magnetic sensors A, B, C, D, E and F consists of an element, such as a magnetoresistance effect element (MR element), having an electric characteristic (resistance) which changes by the action of a magnetic field, whereby the detection signal changes in accordance with a change in an adjacent portion of the target 3a, 3b or 3c which the magnetic sensor opposes. The detection signals of the magnetic sensors A, B, C, D, E and F are supplied to the calculation processing circuit 10 consisting of a microprocessor provided outside or inside the sensor box 11.

Incorporated in the calculation processing circuit 10 is a table 14 which stores absolute angles of the output shaft 7 in rotation in correspondence to calculated electrical angles $\theta_{CD}$ and $\theta_{EF}$ of the targets 3b and 3c.

Incorporated also in the calculation processing circuit 10 is a first map 5a through a fourth map 5d (storage means) which respectively store the relation between results of predetermined calculation based on the respective detection signals of the magnetic sensors A and B which have been measured in advance before factory shipment and electrical angles of the respective detection signals. The first map 5a through the fourth map 5d can be applied to the relation between results of predetermined calculation based on the respective detection signals of the magnetic sensors E and F and electrical angles of the respective detection signals.

Incorporated further in the calculation processing circuit 10 is a fifth map 5e through an eighth map 5h (storage means) which respectively store the relation between results of predetermined calculation based on the respective detection signals of the magnetic sensors C and D which have been measured in advance before factory shipment and electrical angles of the respective detection signals.

The magnetic sensors A, B, C, D, E and F output detection signals having substantially sinusoidal waveforms as the respective targets 3a, 3b and 3c pass by. Although the nonlinear rate of change in each of the detection signals becomes the maximum value in the vicinity of a point where a change in the value turns from rise to fall or from fall to rise, the detection signals can be complemented by the following signal processing method.

Figure 3A:
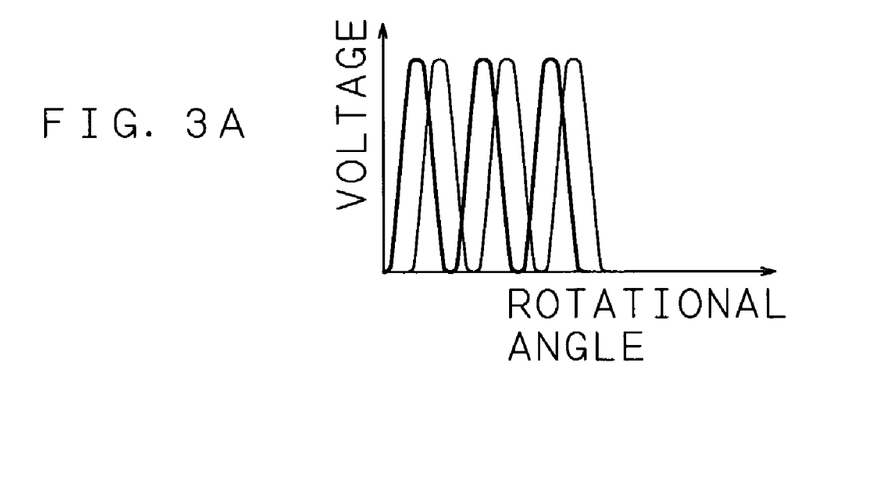
FIGS. 3A through 3C are wave form charts showing examples of the respective detection signals of magnetic sensors.
Figure 3B:
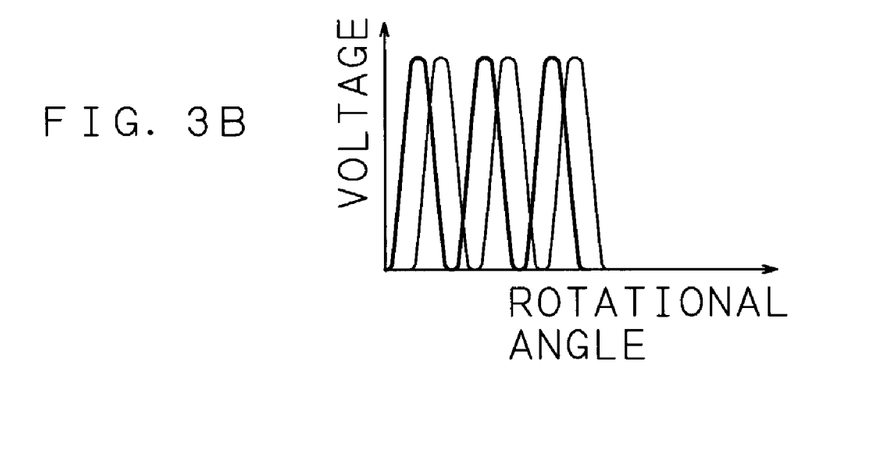
Figure 3C:
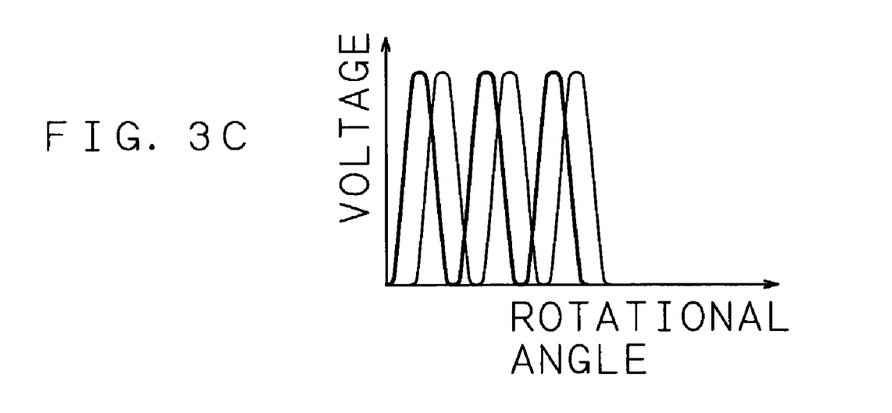

In the torque sensor 4 constructed as above, as shown in FIGS. 3A, 3B and 3C, each of the magnetic sensors A, B, C, D, E and F outputs a detection signal which rises and falls in accordance with a change in a rotational angle of the input shaft 6 or the output shaft 7 while the corresponding target 3a, 3b or 3c passes a position which the magnetic sensor opposes.

The detection signals of the magnetic sensors A and B correspond to the rotational angle of the input shaft 6 provided with the targets 3a corresponding to the magnetic sensors A and B. The detection signals of the magnetic sensors C and D correspond to the rotational angle of the output shaft 7 provided with the targets 3b corresponding to the magnetic sensors C and D. The detection signals of the magnetic sensors E and F correspond to the rotational angle of the output shaft 7 provided with the targets 3c corresponding to the magnetic sensors E and F.

In this manner, the calculation processing circuit 10 can calculate a relative rotational angle of the input shaft 6 on the basis of the detection signals of the magnetic sensors A and B. The calculation processing circuit 10 and the magnetic sensors A and B operate as a rotational angle detecting apparatus of the input shaft 6. The calculation processing circuit 10 can also calculate a relative rotational angle of the output shaft 7 on the basis of the detection signals of the magnetic sensors E and F. The calculation processing circuit 10 and the magnetic sensors E and F operate as a rotational angle detecting apparatus of the output shaft 7.

When torque is applied to the input shaft 6, a difference arises between the respective detection signals of the magnetic sensors A and B and the respective detection signals of the magnetic sensors E and F.

The magnetic sensors A and E and the magnetic sensors B and F are arranged to have phases different from each other by electrical angles of 90°, for example, in the circumferential direction of the target plates 12a and 12c. Although the nonlinear rate of change in each of the detection signals becomes the maximum value at the relative maximum value and the relative minimum value where a change in the value turns from rise to fall or from fall to rise, the detection signals which have phases different from each other can be complemented mutually. It should be understood that the difference in phase angles may be any electrical angle between 1° through 360° as long as complement can be achieved.

Here, the difference between the detection signal of the magnetic sensor A and the detection signal of the magnetic sensor E, or the difference between the detection signal of the magnetic sensor B and the detection signal of the magnetic sensor F, corresponds to the difference (relative angular displacement) between rotational angles of the input shaft 6 and the output shaft 7. The relative angular displacement corresponds to a torsion angle generated at the torsion bar 9 connecting the input shaft 6 and the output shaft 7 by the action of torque applied to the input shaft 6. The torque applied to the input shaft 6 therefore can be calculated on the basis of the aforementioned difference between the detection signals.

Similarly to the magnetic sensor E and the magnetic sensor F, the magnetic sensor C and the magnetic sensor D are arranged to have phases different from each other by electrical angles of 90° in the circumferential direction of the target plate 12b. The number of the targets 3c opposing the magnetic sensors E and F is thirty seven while the number of the targets 3b opposing the magnetic sensors C and D is thirty six. The magnetic sensors E and C and the magnetic sensors F and D therefore output detection signals which, as shown in FIG. 4, have phases to be shifted from each other by 1/37 phase for each rotation of the output shaft 7 of one phase.

Figure 4:
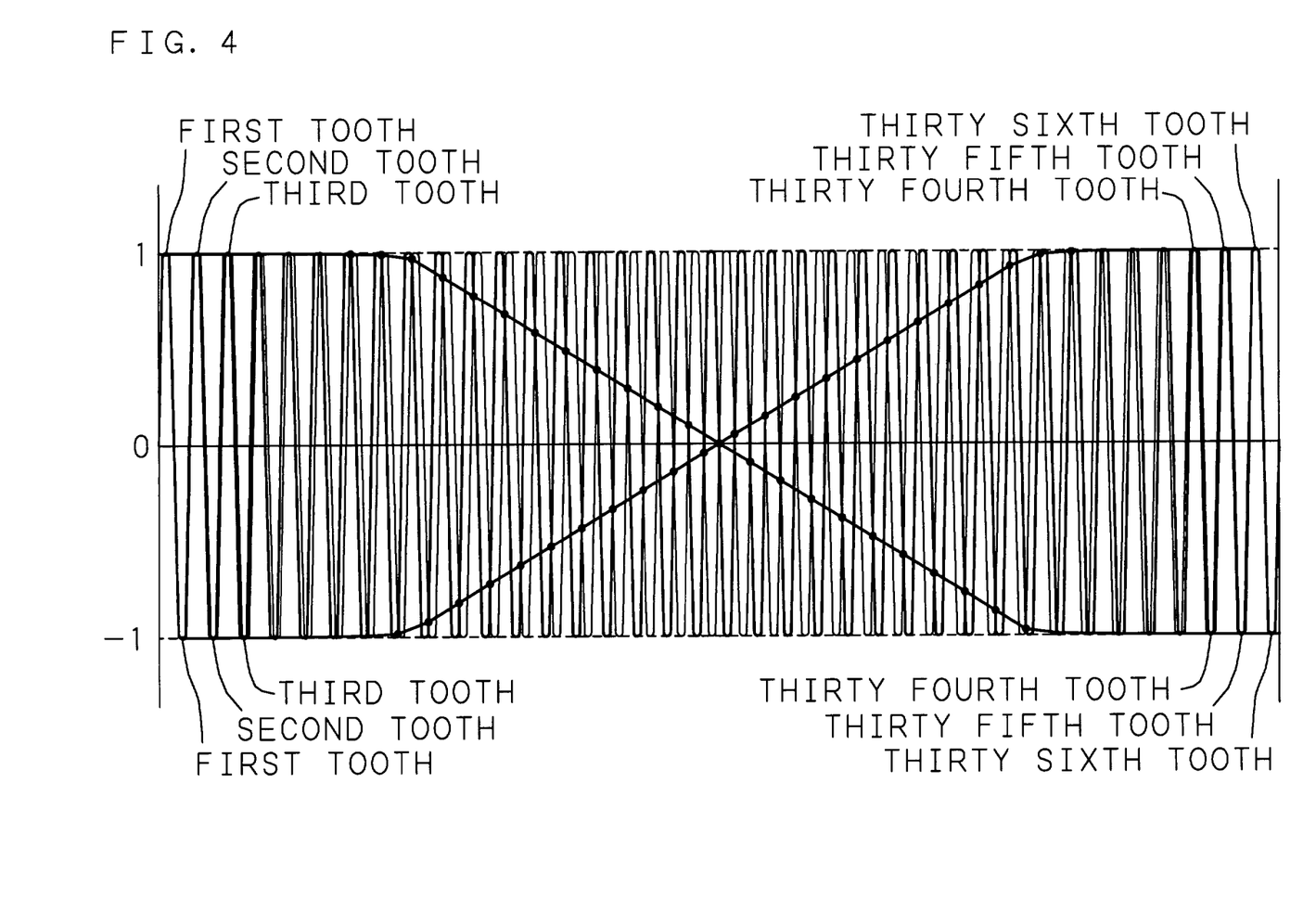
FIG. 4 is a wave form chart showing an example of detection signals of magnetic sensors opposing targets, the numbers of which are different from each other.

In a case where only the magnetic sensors E and C, or only the magnetic sensors F and D, are provided, the rotational angle (absolute rotational angle) of the output shaft 7 cannot be specified since one pair of detection signal values appears twice while the output shaft 7 makes a rotation of 360° as shown in FIG. 4. Referring the table 14, however, the rotational angle of the output shaft 7 can be specified on the basis of the electrical angles $\theta_{CD}$ and $\theta_{EF}$ of the targets 3b and 3c.

Figure 5:
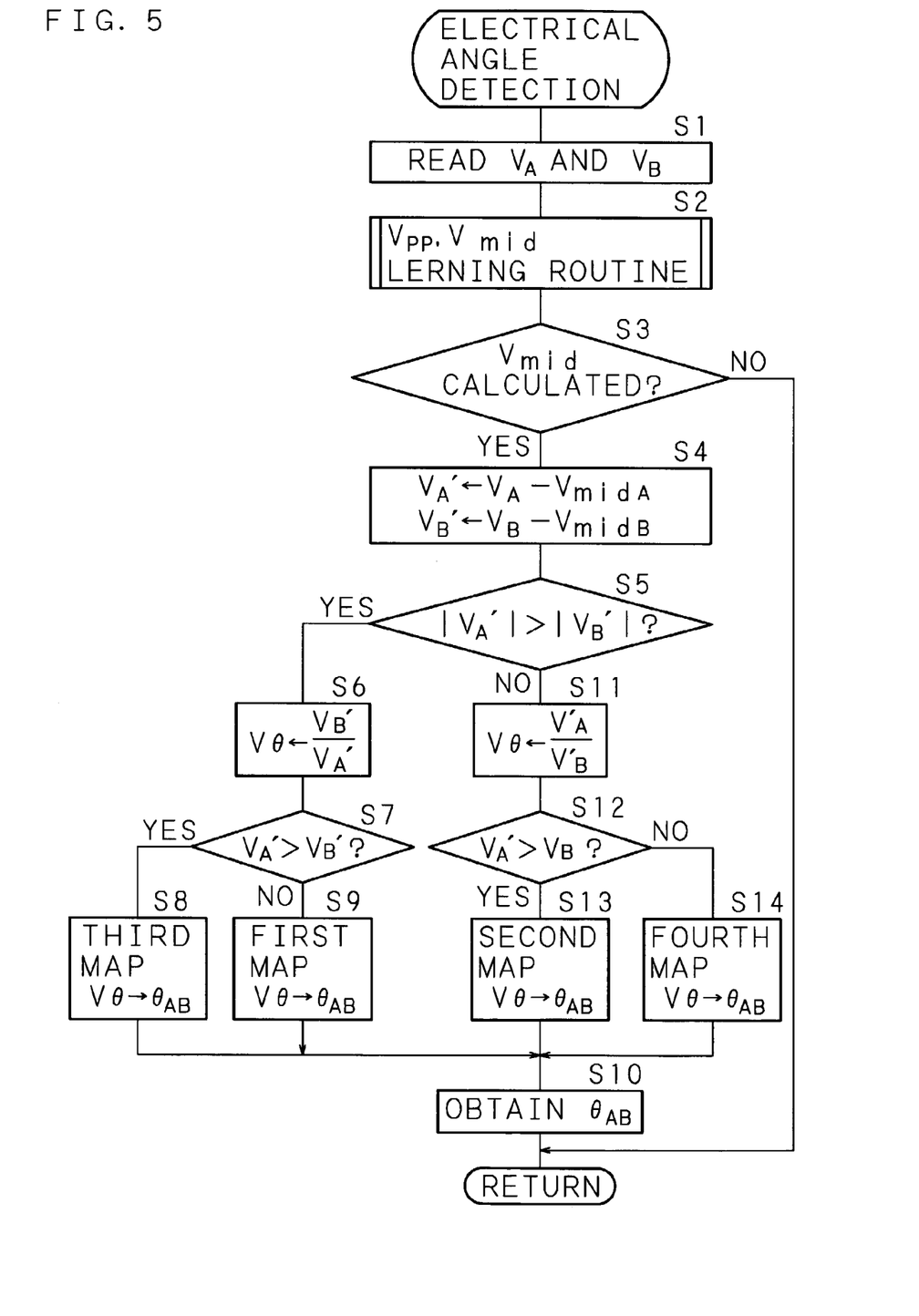
FIG. 5 is a flow chart showing an operation of a calculation processing circuit of an electric power steering apparatus.
Figure 7:
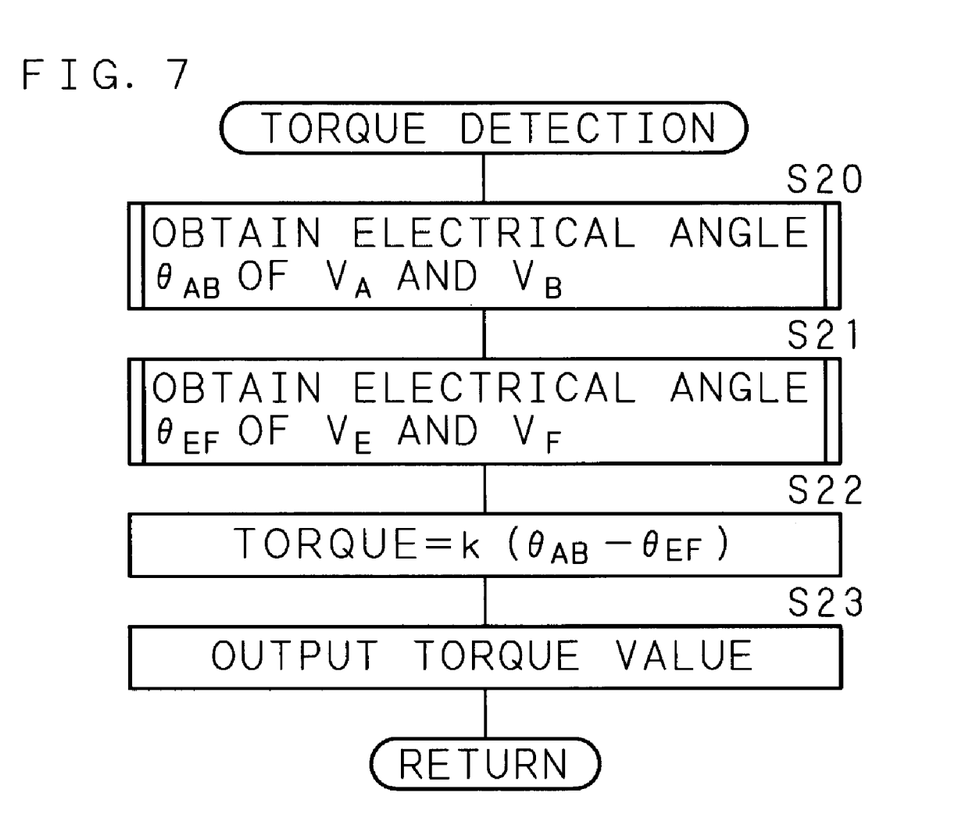
FIG. 7 is a flow chart showing an operation of a calculation processing circuit of an electric power steering apparatus.
Figure 8:
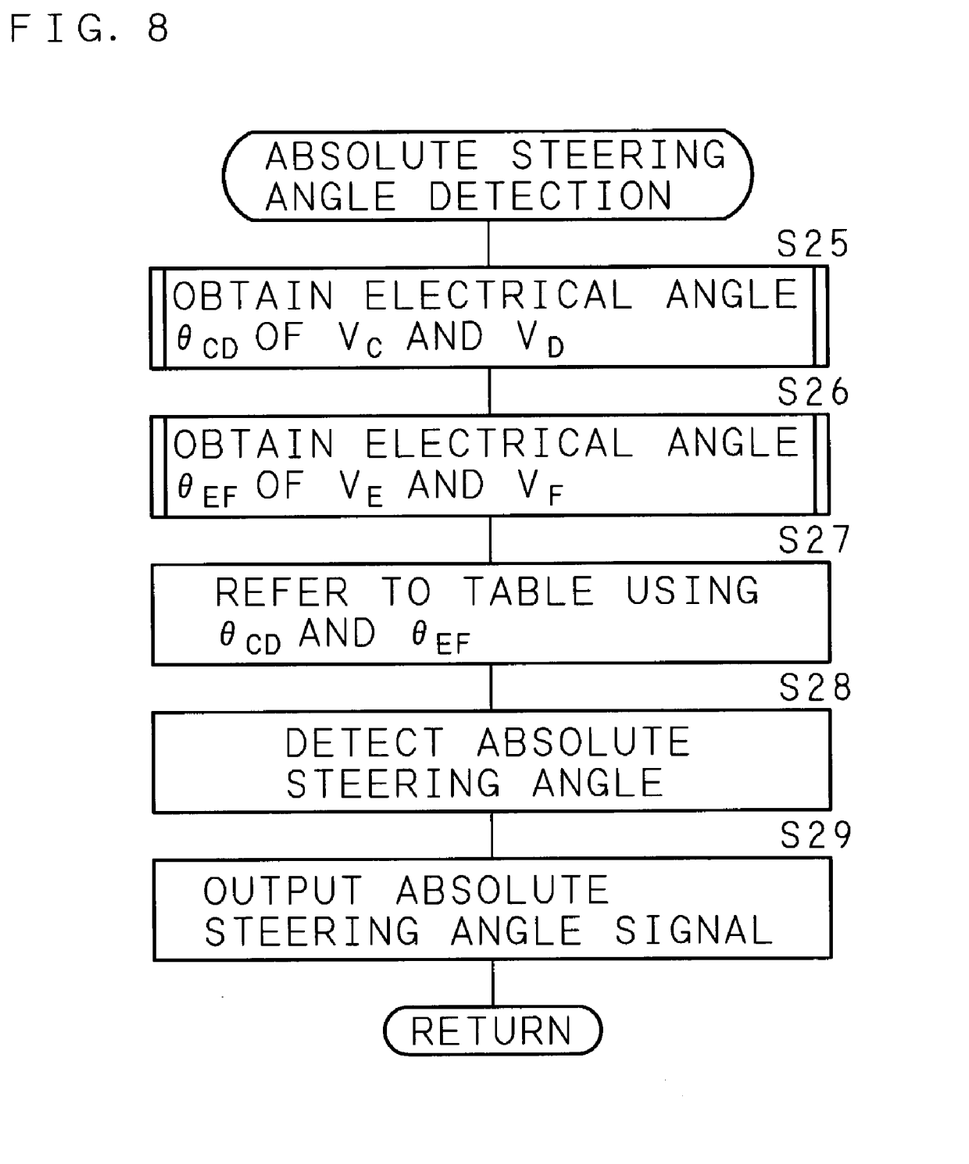
FIG. 8 is a flow chart showing an operation of a calculation processing circuit of an electric power steering apparatus.

The following description will explain operations of the electric power steering apparatus constructed as above by referring to the flow charts in FIGS. 5, 7 and 8 showing the operations.

FIG. 5 is a flow chart showing an operation for obtaining electrical angles of the respective detection signals of the magnetic sensors A and B and the magnetic sensors E and F using the first map 5a through the fourth map 5d. It should be understood that the flow chart can be applied to an operation for obtaining electrical angles of the respective detection signals of the magnetic sensors C and D using the fifth map 5e through the eighth map 5h.

In the first place, the calculation processing circuit 10 reads detection signals $V_A$ and $V_B$ of the magnetic sensors A and B (step S1), executes a routine for learning and calculating the peak-to-peak value $V_{PP}$ of each of the detection signals and the median $V_{mid}$ thereof (step S2) and judges whether the medians $V_{midA}$ and $V_{midB}$ of the respective detection signals have been calculated or not (step S3). When it is judged that the medians $V_{midA}$ and $V_{midB}$ have not been calculated (NO in step S3), the procedure is returned.

When it is judged that the medians $V_{midA}$ and $V_{midB}$ of the respective detection signals have been calculated (YES in step S3), the calculation processing circuit 10 converts the detection signals $V_A$ and $V_B$ to detection signals $V_A'$ and $V_B'$ corresponding to a case where the medians are assumed to be zero, using the following equations (step S4):

$$V_A' = V_A - V_{midA}$$

$$V_B' = V_B - V_{midB}$$

The calculation processing circuit 10 then compares the absolute value $|V_A'|$ of the detection signal $V_A'$ with the absolute value $|V_B'|$ of the detection signal $V_B'$ so as to judge which is larger (step S5). When it is judged in step S5 that $|V_A'|$ is larger than $|V_B'|$, the calculation processing circuit 10 executes a predetermined calculation expressed by the following equation (step S6):

$$V\theta = V_B'/V_A'$$

Figure 6:
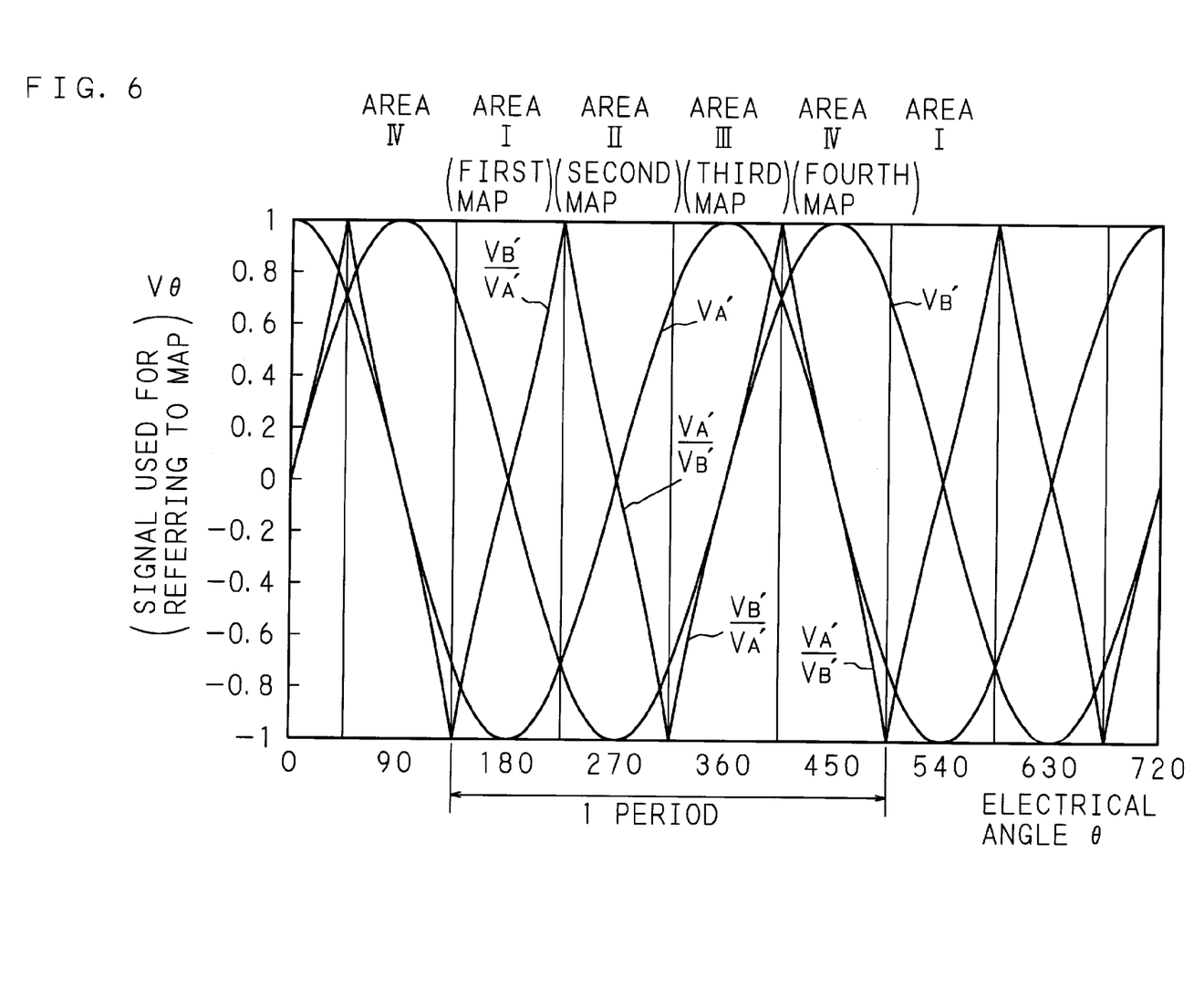
FIG. 6 is an explanatory view showing the relation between wave forms of detection signals $V_A'$ and $V_B'$ and the first map through the fourth map.

Here, in FIG. 6 showing the relation between wave forms of detection signals $V_A'$ and $V_B'$ and the first map 5a through the fourth map 5d, the area I and the area III are areas where $|V_A'|$ is larger.

The calculation processing circuit 10 then compares the detection signal $V_A'$ with the detection signal $V_B'$ so as to judge which of the area I and the area III is the area where the detection signals $V_A'$ and $V_B'$ exist (step S7).

When it is judged in step S7 that $V_A'$ is larger than $V_B'$, the calculation processing circuit 10 judges that the detection signals $V_A'$ and $V_B'$ exist in the area III and, referring to the third map 5c storing the relation between $V\theta(=V_B'/V_A')$ of the area III and the electrical angle $\theta$ of the detection signal $V_A'$, the calculation processing circuit 10 searches the electrical angle $\theta$ of the detection signal $V_A'$ corresponding to $V\theta$ on the basis of the $V\theta(=V_B'/V_A')$ obtained in step S6 (step S8) and obtains the electrical angle (step S10). The procedure is then returned.

It should be understood that, in place of the electrical angle $\theta$ of the detection signal $V_A'$, the electrical angle $\theta$ of the detection signal $V_B'$ may be obtained as long as the phases (when the steering angle is at a neutral point) of the magnetic sensors to be used for calculating the torque and steering angle are the same. In other words, when the electrical angle $\theta$ of the detection signal $V_A'$ is to be obtained here, the electrical angle $\theta$ of the detection signal $V_E'$ is to be obtained, while when the electrical angle $\theta$ of the detection signal $V_B'$ is to be obtained here, the electrical angle θ of the detection signal $V_F'$ is to be obtained. Moreover, no problem will arise when an electrical angle θ is obtained without discriminating between the detection signals $V_A'$ and $V_B'$ and an electrical angle θ is obtained without discriminating between the detection signals $V_E'$ and $V_F'$.

When it is judged in step S7 that $V_B'$ is larger than $V_A'$, the calculation processing circuit 10 judges that the detection signals $V_A'$ and $V_B'$ exist in the area I and, referring to the first map 5a storing the relation between Vθ(=$V_B'/V_A'$) of the area I and the electrical angle θ of the detection signals $V_A'$ and $V_B'$ (electrical angle θ of the detection signal $V_A'$), the calculation processing circuit 10 searches the electrical angle θ of the detection signals $V_A'$ and $V_B'$ corresponding to Vθ on the basis of the Vθ(=$V_B'/V_A'$) obtained in step S6 (step S9) and obtains the electrical angle (step S10). The procedure is then returned.

When it is judged in step S5 that |$V_B'$| is larger than |$V_A'$|, the calculation processing circuit 10 executes a predetermined calculation expressed by the following equation (step S11):

$$V\theta = V_A'/V_B'$$

Here, as shown in FIG. 6, the area II and the area IV are areas where |$V_B'$| is larger.

It should be noted that, by executing a predetermined calculation expressed by the equation:

$$V\theta = V_B'/V_A'$$

when |$V_A'$| is larger (step S6) and executing a predetermined calculation expressed by the equation:

$$V\theta = V_A'/V_B'$$

when |$V_B'$| is larger (step S11), the Vθ can be limited between −1 and +1, and thereby time required for referring to the maps can be shortened and the data volume of each map can be reduced.

The calculation processing circuit 10 then compares the detection signal $V_A'$ with the detection signal $V_B'$ so as to judge which of the area II and the area IV is the area where the detection signals $V_A'$ and $V_B'$ exist (step S12).

When it is judged in step S12 that $V_A'$ is larger than $V_B'$, the calculation processing circuit 10 judges that the detection signals $V_A'$ and $V_B'$ exist in the area II and, referring to the second map 5b storing the relation between Vθ(=$V_A'/V_B'$) of the area II and the electrical angle θ of the detection signals $V_A'$ and $V_B'$, the calculation processing circuit 10 searches the electrical angle θ of the detection signals $V_A'$ and $V_B'$ corresponding to Vθ on the basis of the Vθ (=$V_A'/V_B'$) obtained in step S11 (step S13) and obtains the electrical angle (step S10). The procedure is then returned.

When it is judged in step S12 that $V_B'$ is larger than $V_A'$, the calculation processing circuit 10 judges that the detection signals $V_A'$ and $V_B'$ exist in the area IV and, referring to the fourth map 5d storing the relation between Vθ(=$V_A'/V_B'$) of the area IV and the electrical angle θ of the detection signals $V_A'$ and $V_B'$, the calculation processing circuit 10 searches the electrical angle θ of the detection signals $V_A'$ and $V_B'$ corresponding to Vθ on the basis of the Vθ (=$V_A'/V_B'$) obtained in step S11 (step S14) and obtains the electrical angle (step S10). The procedure is then returned.

It should be noted that the first map 5a through the fourth map 5d have symmetrical curves in an ideal case as shown in FIG. 6. Consequently, the number of variations of the map can be reduced when variation in values of the detection signals $V_A'$ and $V_B'$ measured in advance is small.

By the above-described method for detecting the electrical angle wherein maps prepared using actual measurements are employed, distortion of each magnetic sensor and target can be corrected.

Although the above description has explained a case where $V_A'/V_B'$ or $V_B'/V_A'$ is the predetermined calculation to be executed, the present invention is not limited to this case. Alternatively the predetermined calculation may be, for example, a combination of the four basis operations of arithmetic such as $(V_A'-V_B')/(V_A'+V_B')$ or $(V_A'+V_B')/(V_A'-V_B')$.

FIG. 7 is a flow chart showing an operation for detecting a torque using the first map 5a through the fourth map 5d.

In the first place, the calculation processing circuit 10 detects the electrical angle $\theta_{AB}$ of the detection signals $V_A$ and $V_B$ of the magnetic sensors A and B according to the above-described flow chart in FIG. 5 (step S20) and then, in the same manner, detects the electrical angle $\theta_{EF}$ of the detection signals $V_E$ and $V_F$ of the magnetic sensors E and F (step S21).

The calculation processing circuit 10 then calculates a torque using the following equation (step S22):

$$\text{Torque} = k(\theta_{AB} - \theta_{EF}),$$

where k indicates the spring constant of the torsion bar 9. The calculation processing circuit 10 outputs the calculated torque value (step S23) and the procedure is returned.

FIG. 8 is a flow chart showing an operation for detecting an absolute steering angle using the first map 5a through the eighth map 5h.

In the first place, using the fifth map 5e through the eighth map 5h, the calculation processing circuit 10 obtains the electrical angle $\theta_{CD}$ of the detection signals $V_C$ and $V_D$ of the magnetic sensors C and D according to the above-described flow chart in FIG. 5 (step S25) and then, in the same manner, detects the electrical angle $\theta_{EF}$ of the detection signals $V_E$ and $V_F$ of the magnetic sensors E and F using the first map 5a through the fourth map 5d (step S26).

The calculation processing circuit 10 then refers to the table 14 on the basis of the electrical angles $\theta_{CD}$ and $\theta_{EF}$ (step S27), detects absolute steering angles corresponding to the electrical angles $\theta_{CD}$ and $\theta_{EF}$ (step S28) and outputs signals of the detected absolute steering angles (step S29). The procedure is returned.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A rotational angle detecting apparatus for detecting a rotational angle of a rotor, comprising:
  one or a plurality of first targets provided at the rotor;
  second targets provided at said rotor or another rotor rotating coaxially with said rotor, the number of which is coprime with the number of the first targets;
  a plurality of sensors, disposed opposite to the first targets, for outputting detection signals having phases different from each other in accordance with each position of the first targets as the rotor provided with the first targets rotates;

a plurality of sensors, disposed opposite to the second targets, for outputting detection signals having phases different from each other in accordance with each position of the second targets as the rotor provided with the second targets rotates; and a calculation processing circuit capable of performing operations of:
executing a predetermined calculation on the basis of the detection signals respectively outputted from the plurality of sensors;
storing a relation between a result of calculation executed in advance and an electrical angle of the detection signal corresponding to each of the positions of the first and second targets; and
obtaining an electrical angle of each of the detection signals on the basis of a result of executed calculation by referring to the stored relation between the result of calculation and the electrical angle,
wherein a rotational angle of the rotor is detected on the basis of the electrical angle obtained by the calculation processing circuit.

2. The rotational angle detecting apparatus according to claim 1, wherein the rotor is a gear having teeth made of magnetic material, which are arranged on a peripheral surface of the rotor at regular intervals, as the first targets or second targets, and the sensors are magnetic sensors.

3. A torque detecting apparatus for detecting a torque applied to a first shaft or a second shaft which is connected to the first shaft by a connection shaft, comprising:
a first rotor coaxially provided at the first shaft;
a second rotor coaxially provided at the second shaft;
one or a plurality of first targets provided at the first rotor;
one or a plurality of second targets provided at the second rotor;
a plurality of sensors, disposed opposite to the first targets, for outputting detection signals having phases different from each other in accordance with each position of the first targets as the first rotor rotates;
a plurality of sensors, disposed opposite to the second targets, for outputting detection signals having phases different from each other in accordance with each position of the second targets as the second rotor rotates; and
a calculation processing circuit capable of performing operations of:
executing a predetermined calculation on the basis of the detection signals respectively outputted from the plurality of sensors;
storing a relation between a result of calculation executed in advance and an electrical angle of the detection signal corresponding to each of the positions of the first and second targets;
obtaining an electrical angle of each of the detection signals on the basis of a result of executed calculation by referring to the stored relation between the result of calculation and the electrical angle; and
detecting the torque on the basis of the obtained electrical angle.

4. The torque detecting apparatus according to claim 3, wherein the rotor is a gear having teeth made of magnetic material, which are arranged on a peripheral surface of the rotor at regular intervals, as the targets, and the sensors are magnetic sensors.

5. A torque detecting apparatus for detecting a torque applied to a first shaft or a second shaft which is connected to the first shaft by a connection shaft, comprising:
a rotational angle detecting apparatus according to claim 1, which is provided at one of the first shaft and the second shaft; and
a first target and a plurality of sensors provided at the other of the first shaft and the second shaft,
wherein the calculation processing circuit executes a predetermined calculation respectively on the basis of detection signals outputted from the sensors of the targets provided at the first shaft and the second shaft, obtains each electrical angle of each of the detection signals on the basis of a result of executed calculation by referring to a stored relation between a result of calculation and an electrical angle and detects a torque applied to the first shaft or the second shaft on the basis of each of the obtained electrical angles.

* * * * *